July 19, 1960 F. H. EVANS 2,945,601
APPARATUS FOR TURNING ROUND BARS
Filed April 30, 1959 3 Sheets-Sheet 1

INVENTOR.
Frederick H. Evans
BY
Frease, Bishop, Johns & Schick
ATTORNEYS

July 19, 1960  F. H. EVANS  2,945,601
APPARATUS FOR TURNING ROUND BARS
Filed April 30, 1959  3 Sheets-Sheet 3

INVENTOR.
Frederick H. Evans
BY
Frease, Bishop, Johns & Schick
ATTORNEYS

United States Patent Office 2,945,601
Patented July 19, 1960

2,945,601

APPARATUS FOR TURNING ROUND BARS

Frederick H. Evans, Massillon, Ohio, assignor to Evans Enterprises, Inc., Massillon, Ohio, a corporation of Ohio Filed Apr. 30, 1959, Ser. No. 810,005

10 Claims. (Cl. 214—1)

The invention relates to apparatus for handling bars and the like, and more particularly to a machine for turning round bars, pipes and similar articles so as to successively present all portions of the surfaces thereof for inspection and scarfing or other conditioning.

Bars and the like, after being rolled, are inspected and marked for any scarfing or other conditioning found necessary. This requires that each bar be turned upon its axis so as to successively present each portion of the surface thereof for inspection.

Imperfections on the surface of the bar are marked by the inspection, after which the bar is then turned so that such marked portions may be accessible to the workman for scarfing or otherwise conditioning the same.

Under present practice no satisfactory device has been provided for readily and conveniently turning round bars and similar articles to permit such inspection and conditioning of the bars.

It is therefore an object of the present invention to provide means for readily turning round bars and the like so as to successively present all portions of the surfaces thereof to workmen for inspecting and conditioning the same.

Another object of the invention is to provide an apparatus for picking up bars from a charging station, turning the bars axially to present all portions of the surfaces thereof to workmen for inspection and conditioning and then delivering the bars to a discharge station.

A further object of the invention is to provide such an apparatus including a spaced pair of rotatable discs mounted for rotation in unison, the discs having notches in their peripheries for picking up a bar from a charging station and conveying it into the apparatus.

A still further object of the invention is to provide apparatus of the character referred to in which each of the discs has a pair of notches located at spaced points upon its periphery, one of the notches in each disc acting to convey bars from a charging station into the turning apparatus, and the other notch of each disc serving to convey the bars from the turning apparatus to a discharge station.

Another object of the invention is to provide an apparatus of this character in which spring-loaded stop means cooperate with the rotatable discs for turning the bars axially so as to present all surfaces thereof to the workman.

The above and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicant has contemplated applying the principle, being set forth in detail in the following description and illustrated in the accompanying drawings.

In general terms, the invention may be described as comprising a frame having a charging station at one end thereof, a discharge station at the other end of the frame, and a pair of rotatable discs located between the charging station and the discharge station.

Means is provided for rotating the discs in either direction, in unison. Each disc has substantially one-half of its periphery of considerably less diameter than the remainder thereof, with a notch at each end of said smaller diameter portion of the periphery.

Spring-loaded stop arms are pivotally mounted upon the frame and normally urged into contact with the peripheral portions of the discs. Arcuate end portions upon these arms provide stops to position the bars at a point accessible to the workman, for turning of the bars axially by rotation of the discs.

One notch in each disc serves to pick up bars from the charging station, and by rotation of the discs, to carry the bars into contact with the stop members where the bars are rotated axially by rotation of the discs, and the other notch in each disc receives the bars from the turning station and conveys them to the discharge station.

The bars are rotated, against the flexible stop members, by frictional contact with the smaller diameter peripheral portions of the discs. The spring-loaded stop arms are swung away from the smaller diameter peripheral portions of the discs by contact with the larger diameter portions of the discs, at which time the bar drops into the discharge notches in the disc and by rotation of the discs in reverse direction, the bar is deposited onto the discharge station.

A preferred embodiment of the invention is illustrated in the accompanying drawings, in which.

Reference is now made to the embodiment of the invention illustrated in the drawings, in which similar numerals refer to similar parts throughout.

Figure 1:
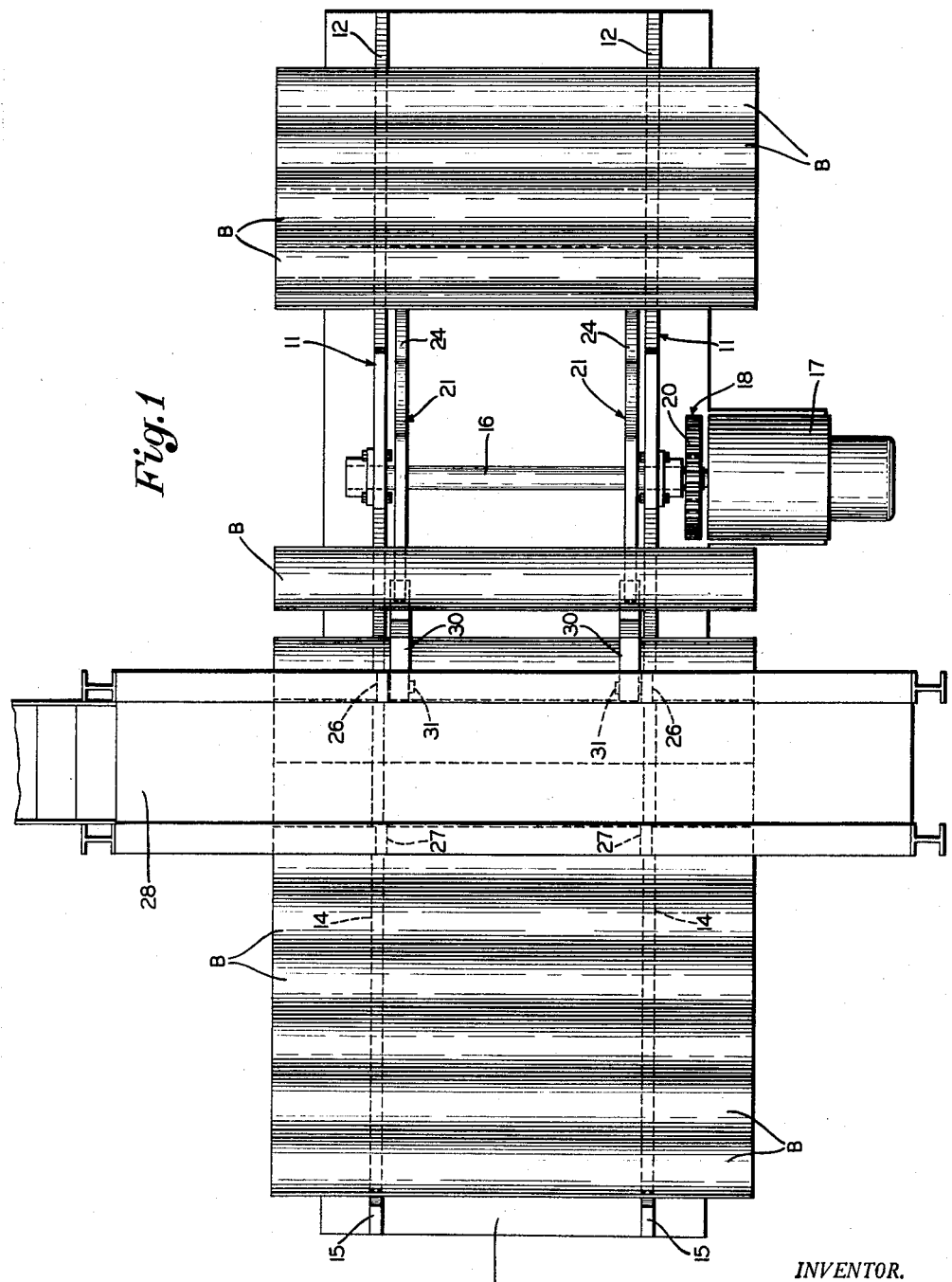
Fig. 1 is a top plan view of the improved bar-turning apparatus.

The apparatus is mounted upon a frame comprising the base 10, upon which is mounted a laterally spaced pair of longitudinally disposed frame members indicated generally at 11. Each frame member has a downwardly and inwardly inclined charging rail 12 formed thereon, providing a charging station for receiving and retaining thereon a plurality of round bars as indicated at B.

An upright stop shoulder 13 is formed upon each frame member 11, at the inner end of the charging station thus formed, to limit downward and inward movement of the bars. At the other end of the frame members 11, a discharge station is formed by means of the discharge rails 14, an upright stop member 15 being provided at the outer end of each of the rails 14 for limiting the movement of the bars B as they are discharged from the apparatus.

A shaft 16 is journalled through the intermediate portions of the frame members 11 and is adapted to be rotated by a reversing motor 17, through a gear reduction 18 which may be in the form of a pinion 19 upon the shaft of the motor meshing with a relatively large gear wheel 20 upon the shaft 16.

A spaced pair of discs, indicated generally at 21, is fixed upon the shaft 16. Each disc has a relatively large diameter peripheral portion 22 extending substantially half-way therearound, the remainder of the disc having a relatively small diameter peripheral portion 23.

Notches 24 and 25 are provided in each disc at substantially diametrically opposite points, said notches being located at the adjacent ends of the large and small diameter peripheral portions of the disc.

Spaced pairs of uprights 26 and 27 are located on the discharge side of the discs 21 for supporting a platform 28 upon which a workman may stand to inspect bars being turned in the apparatus.

A scarfer's platform 28 may be placed upon the top of the uprights 26 and 27, as indicated in broken lines at 29, after the bars have been inspected and when it is desired that they be conditioned.

Spring-loaded stop arms 30 are pivotally mounted as at 31 upon the uprights 26. For the purpose of illustration, springs 32 are shown connected at opposite ends to the arms 30 and to the uprights 26 for normally urging the outer ends of the arms into contact with the peripheral portions of the discs 21. It should be understood that the springs 32 are merely for the purpose of illustration and that any desired form of spring means may be provided for this purpose.

The outer ends of the arms 30 are provided with the angularly disposed stop portions 33 having the arcuate edges 34 which act as stops to position the bars at a point convenient to the workman where the bars may be axially turned to present all portions of the surfaces thereof to the workman for inspection or conditioning as the case may be.

Figure 3:
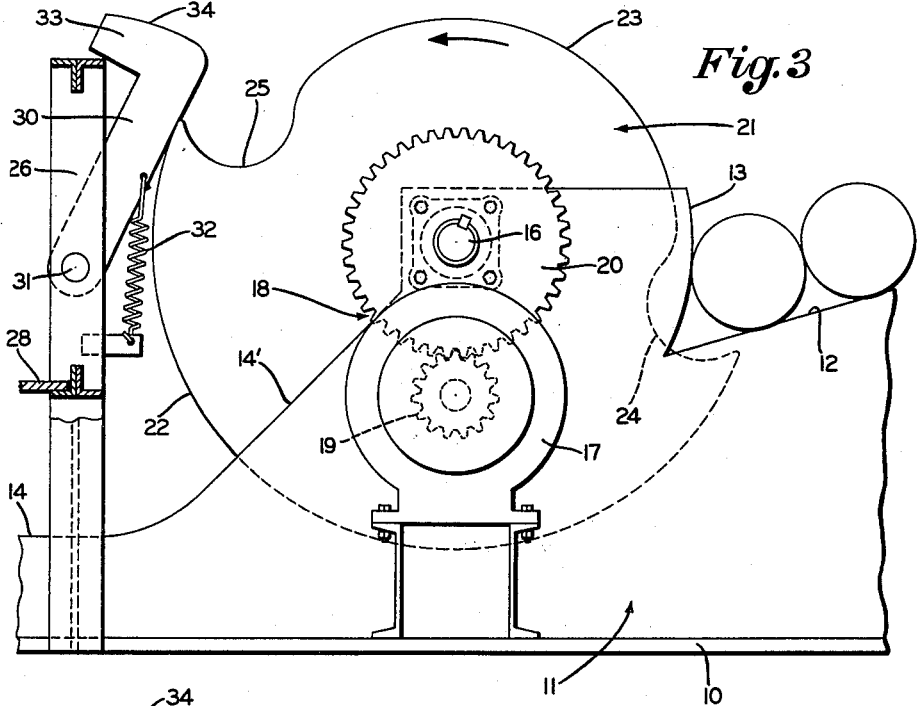
Fig. 3 is a fragmentary side elevation showing the discs with the charging notches thereof in position to pick up a bar from the charging station.

Bars to be inspected or conditioned are placed upon the charging rails 12 as indicated at B in Fig. 1. The discs 21 are then rotated to the position shown in Fig. 3, locating the charging notches 24 thereof below the innermost bar on the charging rails.

Figure 2:
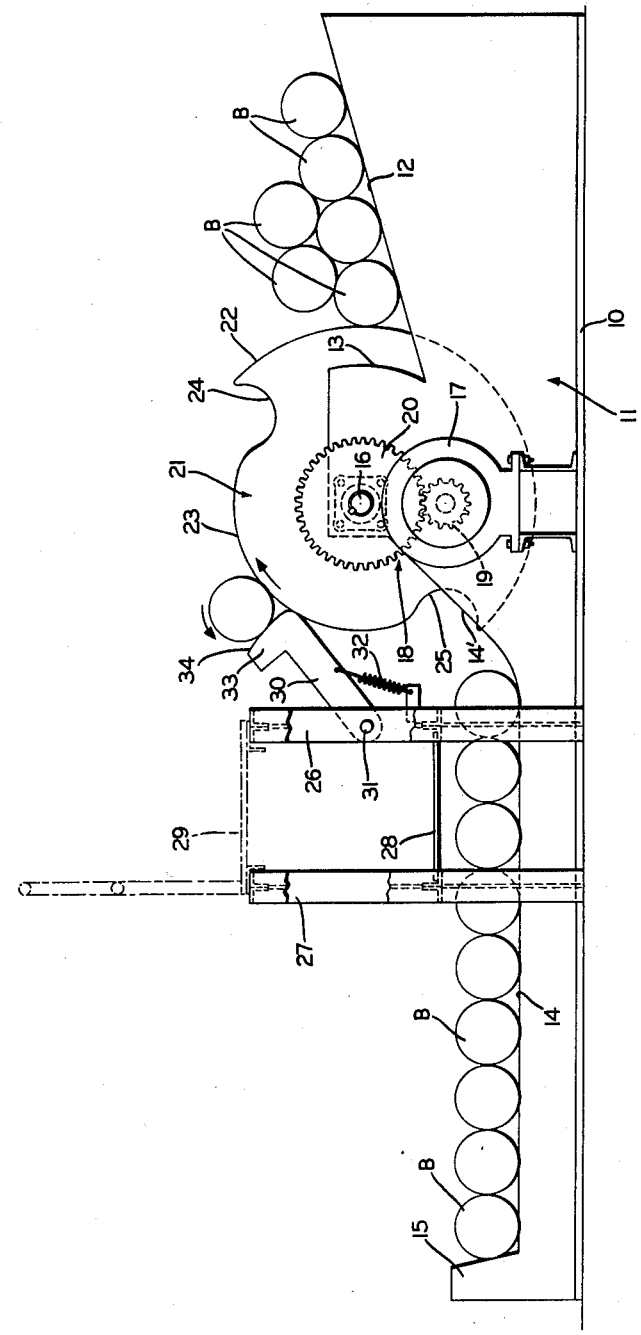
Fig. 2 is a side elevation of the apparatus showing a bar being rotated against the spring-loaded stop arms by the smaller diameter portions of the rotatable discs.

The discs are then rotated in counter-clockwise direction as viewed in the drawings, this endmost bar being picked up from the charging rails by the charging notches 24 of the discs and the bar is deposited against the arcuate ends 34 of the spring-loaded stop arms in the position shown in Fig. 2. As the discs are then rotated in clockwise direction, the bar will be axially turned presenting all portions of the surfaces thereof to the inspector.

It should be understood that a control switch for the motor is located at a convenient position where the workman may operate the same to start or reverse the motor to carry out the operation, or to stop the motor at any time that it is not necessary for the inspector to mark a defect on the surface of a bar, or at any time that it is necessary for the scarfer to work upon any marked portion of the bar.

Figure 4:
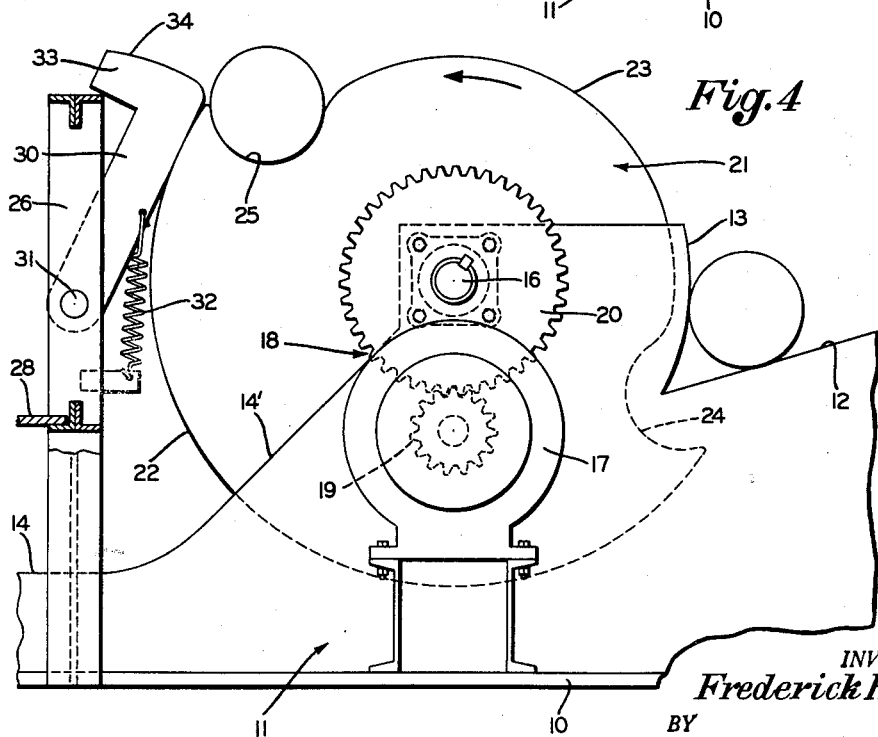
Fig. 4 is a view similar to Fig. 3, showing the bar received in the discharge notches of the discs.

After the bar has been completely turned so as to present all portions of the surfaces to the workman, the clockwise rotation of the discs 21 is continued until they reach the position shown in Fig. 4, at which time the larger diameter peripheral portions 22 of the discs will contact the spring-loaded stop arms 30, swinging them outward to the position shown in Fig. 4, at which time the bar which has been inspected or conditioned, as the case may be, will be received into the discharge notches 25 of the discs.

The motor may then be stopped and reversed, rotating the discs 21 in a counter-clockwise direction to the point where the bar will drop out of the notches 25 in the discs and onto the downwardly and outwardly inclined portions 14' of the discharge rails, permitting the bar to roll downward onto the discharge rails 14. It will be seen by referring to Fig. 4, that another bar will have been picked up by the charging notches 24 of the discs during this time.

Continued movement of the discs in counter-clockwise direction will deposit this bar against the arcuate faces 34 of the spring-loaded stop arms 30, as indicated in Fig. 2, at which time the motor may be stopped and reversed to rotate the discs in clockwise direction, the smaller diameter peripheral portions 23 of the discs again turning the bar axially against the stop arms in the manner above described.

This operation of the apparatus may be continued, conveying the bars one at a time from the charging station to the turning position of Fig. 2 where they may be inspected, or conditioned, and then discharged onto the discharge station as above described.

The operation is the same for conditioning or scarfing of the bars as above described. However, preferably the platform 29 is placed upon the top of the uprights 26 and 27 so that the scarfer may stand thereon and with the conventional long-handled tool he may scarf the required portions of each bar as it is turned by the apparatus.

From the above it will be obvious that a simple, inexpensive and efficient apparatus is provided for continuously picking up bars from a charging station, moving them to a position convenient to the workmen where the bars are axially rotated to present all portions of the surfaces thereof, and then discharging the bars from the apparatus onto a discharge station.

The inspection or scarfing of the bars may be carried out quickly and easily, the workman at all times having control of the apparatus so that he may stop the same at any time for inspection or conditioning of the bar and may control the operation of the discs in either direction as required for carrying out the steps of the operation.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. Apparatus for turning round bars and the like, said apparatus comprising a charging station, a discharge station, a pair of rotatable discs located between said stations, a portion of the periphery of each disc being of relatively large diameter, a notch in the periphery of the disc at each end of said large diameter peripheral portion, the remainder of the periphery of the disc being of smaller diameter, spring-loaded stop arms normally contacting the peripheral portions of the discs, and means for rotating said discs in unison to pick up a bar from the charging station in one set of said notches and moves the bar into contact with said stop arms, then turn the bar axially, and then deposit the bar in the other set of notches and deliver it to the discharge station.

2. Apparatus for turning round bars and the like, said apparatus comprising a charging station, a discharge station, a pair of rotatable discs located between said stations, a portion of the periphery of each disc being of relatively large diameter, a notch in the periphery of the disc at each end of said large diameter peripheral portion, the remainder of the periphery of the disc being of smaller diameter, spring-loaded stop arms normally contacting the peripheral portions of the discs, and means for rotating said discs in unison alternately in opposite directions to pick up a bar from the charging station in one set of said notches and move the bar into contact with said stop arms, then turn the bar axially, and then deposit the bar in the other set of notches and deliver it to the discharge station.

3. Apparatus for turning round bars and the like, said apparatus comprising a charging station, a discharge station, a pair of rotatable discs located between said stations, a portion of the periphery of each disc being of relatively large diameter, a notch in the periphery of the disc at each end of said large diameter peripheral portion, the remainder of the periphery of the disc being of smaller diameter, spring-loaded stop arms normally contacting the peripheral portions of the discs, arcuate end portions upon said stop arms, and means for rotating said discs in unison to pick up a bar from the charging station in one set of said notches and move the bar into contact with the arcuate end portions of said stop arms, then turn the bar axially, and then deposit the bar in the other set of notches and deliver it to the discharge station.

4. Apparatus for turning round bars and the like, said apparatus comprising a charging station, a discharge station, a pair of rotatable discs located between said stations, a portion of the periphery of each disc being of relatively large diameter, a notch in the periphery of the disc at each end of said large diameter peripheral portion, the remainder of the periphery of the disc being of smaller diameter, spring-loaded stop arms normally contacting the peripheral portions of the discs, arcuate end portions upon said stop arms, and means for rotating said discs in unison alternately in opposite directions to pick up a bar from the charging station in one set of said notches and move the bar into contact with the arcuate end portions of said stop arms, then turn the bar axially, and then deposit the bar in the other set of notches and deliver it to the discharge station.

5. Apparatus for turning round bars and the like, said apparatus comprising a charging station, a discharge station, a pair of rotatable discs located between said stations, substantially one-half of the periphery of each disc being of relatively large diameter, a notch in the periphery of the disc at each end of said large diameter peripheral portion, the remainder of the periphery of the disc being of smaller diameter, spring-loaded stop arms normally contacting the peripheral portions of the discs, and means for rotating said discs in unison to pick up a bar from the charging station in one set of said notches and move the bar into contact with said stop arms, then turn the bar axially, and then deposit the bar in the other set of notches and deliver it to the discharge station.

6. Apparatus for turning round bars and the like, said apparatus comprising a charging station, a discharge station, a pair of rotatable discs located between said stations, substantially one-half of the periphery of each disc being of relatively large diameter, a notch in the periphery of the disc at each end of said large diameter peripheral portion, the remainder of the periphery of the disc being of smaller diameter, spring-loaded stop arms normally contacting the peripheral portions of the discs, and means for rotating said discs in unison alternately in opposite directions to pick up a bar from the charging station in one set of said notches and move the bar into contact with said stop arms, then turn the bar axially, and then deposit the bar in the other set of notches and deliver it to the discharge station.

7. Apparatus for turning round bars and the like, said apparatus comprising a charging station, a discharge station, a pair of rotatable discs located between said stations, a portion of the periphery of each disc being of relatively large diameter, a notch in the periphery of the disc at each end of said large diameter peripheral portion, said notches being oppositely disposed, the remainder of the periphery of the disc being of smaller diameter, spring-loaded stop arms normally contacting the peripheral portions of the discs, and means for rotating said discs in unison to pick up a bar from the charging station in one set of said notches and move the bar into contact with said stop arms, then turn the bar axially, and then deposit the bar in the other set of notches and deliver it to the discharge station.

8. Apparatus for turning round bars and the like, said apparatus comprising a charging station, a discharge station, a pair of rotatable discs located between said stations, a portion of the periphery of each disc being of relatively large diameter, a notch in the periphery of the disc at each end of said large diameter peripheral portion, said notches being oppositely disposed, the remainder of the periphery of the disc being of smaller diameter, spring-loaded stop arms normally contacting the peripheral portions of the discs, and means for rotating said discs in unison alternately in opposite directions to pick up a bar from the charging station in one set of said notches and move the bar into contact with said stop arms, then turn the bar axially, and then deposit the bar in the other set of notches and deliver it to the discharge station.

9. Apparatus for turning round bars and the like, said apparatus comprising a charging station, a discharge station, a pair of rotatable discs located between said stations, spaced charging and discharge notches in the periphery of each disc, spring-loaded stop means normally located in the paths of the peripheral portions of the discs, means on the discs adjacent said discharge notches for depressing said stop means, and means for rotating said discs in unison to pick up a bar from the charging station in said charging notches and move the bar into contact with said stop means, then turn the bar axially, and then deposit the bar in said discharge notches and deliver it to the discharge station.

10. Apparatus for turning round bars and the like, said apparatus comprising a charging station, a discharge station, a pair of rotatable discs located between said stations, spaced charging and discharge notches in the periphery of each disc, spring-loaded stop means normally located in the paths of the peripheral portions of the discs, means on the discs adjacent said discharge notches for depressing said stop means, and means for rotating said discs in unison alternately in opposite directions to pick up a bar from the charging station in said charging notches and move the bar into contact with said stop means, then turn the bar axially, and then deposit the bar in said discharge notches and deliver it to the discharge station.

No references cited.